(12) United States Patent
Tester et al.

(10) Patent No.: US 7,360,946 B2
(45) Date of Patent: Apr. 22, 2008

(54) TIME TEMPERATURE INDICATORS LINKED TO SENSORY DETECTION

(75) Inventors: Richard Tester, Glasgow (GB); Farage Al-Ghazzewi, Glasgow (GB)

(73) Assignee: Temp-Tell Limited, Glasgow (GB)

( * ) Notice: Subject to any disclaimer, the term of this patent is extended or adjusted under 35 U.S.C. 154(b) by 186 days.

(21) Appl. No.: 10/482,924

(22) PCT Filed: Jul. 8, 2002

(86) PCT No.: PCT/GB02/03106

§ 371 (c)(1),
(2), (4) Date: Jun. 23, 2004

(87) PCT Pub. No.: WO03/006941

PCT Pub. Date: Jan. 23, 2003

(65) Prior Publication Data

US 2004/0233967 A1    Nov. 25, 2004

(30) Foreign Application Priority Data

Jul. 7, 2001    (GB) ................. 0116653.7

(51) Int. Cl.
*G01K 11/00* (2006.01)
*G01K 3/04* (2006.01)

(52) U.S. Cl. .................. 374/160; 116/207; 116/216; 374/106

(58) Field of Classification Search ............. 374/160, 374/162, 106, 102, 103, 104, 105, 100; 116/206, 116/216, 207
See application file for complete search history.

(56) References Cited

U.S. PATENT DOCUMENTS

| | | | |
|---|---|---|---|
| 2,261,473 A * | 11/1941 | Jennings ................... 436/7 |
| 3,205,158 A * | 9/1965 | Renier ...................... 374/102 |
| 3,352,794 A * | 11/1967 | Abdo ...................... 252/408.1 |
| 3,774,450 A * | 11/1973 | Godsey .................... 374/106 |
| 3,786,777 A * | 1/1974 | Smith et al. ................ 116/206 |
| 3,868,218 A * | 2/1975 | Tornmarck et al. ......... 436/183 |
| 3,942,467 A * | 3/1976 | Witonsky ................. 116/207 |
| 3,954,011 A * | 5/1976 | Manske ..................... 374/102 |
| 4,022,149 A * | 5/1977 | Berger .................... 116/219 |
| 4,038,873 A * | 8/1977 | Kimmel ..................... 374/102 |
| 4,042,336 A * | 8/1977 | Larsson ....................... 422/58 |
| 4,184,960 A | 1/1980 | Schotten ..................... 210/230 |
| 4,212,153 A * | 7/1980 | Kydonieus et al. ............. 368/62 |
| 4,382,700 A * | 5/1983 | Youngren ................. 374/102 |
| 4,432,656 A * | 2/1984 | Allmendinger ............. 374/102 |
| 4,468,137 A * | 8/1984 | Hilsum et al. .............. 374/160 |
| 4,509,449 A * | 4/1985 | Chalmers .................... 116/218 |
| 4,533,640 A * | 8/1985 | Shafer ............................ 436/2 |
| 4,643,588 A * | 2/1987 | Postle et al. ................ 374/160 |
| 4,664,056 A * | 5/1987 | Jehanno ..................... 116/217 |
| 4,729,671 A * | 3/1988 | Asano et al. ............... 374/160 |
| 4,805,188 A * | 2/1989 | Parker ..................... 374/141 |
| 4,812,053 A * | 3/1989 | Bhattacharjee ............. 374/102 |
| 4,927,270 A * | 5/1990 | Bonnard ...................... 374/16 |
| 4,929,090 A * | 5/1990 | Grahm ...................... 374/102 |
| 4,941,425 A * | 7/1990 | Holzer ...................... 116/217 |
| 5,057,434 A * | 10/1991 | Prusik et al. .................. 436/2 |
| 5,120,137 A * | 6/1992 | Ou-Yang .................... 374/106 |
| 5,215,378 A * | 6/1993 | Manske ...................... 374/105 |
| 5,254,473 A * | 10/1993 | Patel .......................... 436/1 |
| 5,667,303 A * | 9/1997 | Arens et al. ................ 374/102 |
| 6,176,197 B1 * | 1/2001 | Thompson ................. 116/217 |
| 6,382,125 B1 * | 5/2002 | Tamura ..................... 116/207 |
| 6,514,462 B1 * | 2/2003 | Simons .................... 422/82.12 |
| 6,544,925 B1 * | 4/2003 | Prusik et al. ............... 503/201 |
| 6,614,728 B2 * | 9/2003 | Spevacek ................. 368/327 |
| 6,694,913 B2 * | 2/2004 | Cooperman ............... 116/216 |
| 6,916,130 B1 * | 7/2005 | Holt et al. ............. 400/120.01 |
| 7,011,037 B2 * | 3/2006 | Cooperman ............... 116/216 |
| 2003/0188676 A1 * | 10/2003 | Petrakis ..................... 116/216 |
| 2003/0214997 A1 * | 11/2003 | Diekmann et al. ......... 374/102 |

FOREIGN PATENT DOCUMENTS

| | | |
|---|---|---|
| FR | 2349824 | 4/1976 |
| JP | 60055236 A * | 3/1985 |
| WO | WO 9628714 A1 * | 9/1996 |
| WO | WO 00/47964 | 8/2000 |

* cited by examiner

*Primary Examiner*—Gail Verbitsky
(74) *Attorney, Agent, or Firm*—Ked & Associates, LLP

(57) ABSTRACT

A thermal history indicator comprising a temperature sensitive material, a sensing device, a heat insulating material functioning to buffer the temperature sensitive material against temperature change, and an activation means. The triggering of the activation means allows a molten phase of the temperature sensitive material to interact with the sensing device, or cease interacting with the sensing device, thereby altering its chemical, biochemical or microbiological.

19 Claims, 1 Drawing Sheet

TIME TEMPERATURE INDICATORS LINKED TO SENSORY DETECTION

BACKGROUND

There is great deal of interest at the present time in defining inappropriate temperatures to which products like foods and pharmaceuticals have been exposed. This information can then be used to reject the products and hence protect consumer health. Similarly, it is important that a time delay or shelf-life is built into a quality monitoring system. The following text defines the development of a novel time-temperature indicator which can trigger one or more detection systems.

Until recently, time-temperature indicators have been based around the production of easily visible responses to time-temperature linked events. However, limitations are imposed upon these systems in the sense that every product must be examined by eye or another optical system to confirm that a chemical event had occurred. The following invention is applicable to optical systems in a broad sense in terms of the activation and compartmentalisation technologies employed.

SUMMARY OF THE INVENTION

According to the present invention there is provided a thermal history indicator comprising a temperature sensitive material and sensing device wherein an alteration of the physio-chemical properties (chemical, biochemical or microbiological) of the sensing device occurs when the temperature exceeds a pre-determined value, characterised in that the thermal history indicator comprises a heat insulating material which buffers the temperature sensitive material and stops the sensing device undergoing the physio-chemical alteration if the temperature transiently exceeds and is then re-cooled to below the pre-determined value.

Preferably the thermal history indicator comprises activation means.

In a first embodiment triggering of the activation means allows a molten phase of the temperature sensitive material to interact with the sensing device, thereby altering the chemical, biochemical or microbiological properties of the sensing device.

This aspect of the invention provides an insulated melting device which upon triggering allows a temperature melted molten phase to interact directly with a sensing device and alter its physio-chemical properties (chemical, biochemical or microbiological).

The molten phase may interact directly with the sensing device to alter its chemical, biochemical or microbiological properties.

Alternatively, the molten phase may carry a reactive species to interact with the sensing device to alter its chemical, biochemical or microbiological properties. The interaction of the reactive species and the sensing device may be direct or indirect.

In a second embodiment triggering of the activation means allows a molten phase of the temperature sensitive material to cease to interact with the sensing device, thereby altering the chemical, biochemical or microbiological properties of the sensing device.

This aspect of the invention provides an insulated melting device which upon triggering allows a temperature melted molten phase to cease interaction with a sensing device and alter its physio-chemical properties (chemical, biochemical or microbiological).

Prior to triggering, the temperature sensitive material and the sensing device may interact directly.

Alternatively, the temperature sensitive material may carry a reactive species, which prior to triggering, interacts with the sensing device. The interaction of the reactive species and the sensing device may be direct or indirect.

The thermal history indicator may comprise one or more compartments such as wells or the like, in which the temperature sensitive material can be held. The one or more wells may be sealed by a film or barrier which can be broken and which acts as the activation means.

In one embodiment the sensing device may be positioned centrally between the wells.

Activation is optionally carried out by physical means.

The heat insulating means may delay melting of the temperature sensitive material.

BRIEF DESCRIPTION OF THE DRAWINGS

A detailed description of preferred embodiments of the invention are provided below in conjunction with the following drawings.

DETAILED DESCRIPTION OF PREFERRED EMBODIMENTS

There will now be described, by way of example only, various embodiments of the invention.

A temperature indicator relies on a temperature specific trigger. The principle component of the indicating device of this embodiment is a chemical that melts at a specific temperature. A broad range of chemical species are appropriate for this purpose, and various compounds or mixtures thereof could be used to give a sharp or broad melting profile, as would be known to one skilled in the art.

The temperature sensitive material exists in a solid, matrix arrangement at a temperature below its melting point, and a molten state at a temperature above its melting point.

The temperature sensitive material itself could react with a sensing device that forms part of the thermal history indicator. However, the melting material can usefully be employed in many circumstances when it acts as a carrier to another chemical, biochemical (enzyme) or microbiological species.

This reactive species participates in a reaction as a consequence of it being freed from the matrix in which it is held upon melting. The species reacts with a second species located away from the solid matrix but in contact when the temperature sensitive material is in its molten state.

The additional reacting species (second reactant) may also be located within the matrix. The two are then able to interact when the material is in its molten state and the matrix no longer separates the two. This system can slow the rate of chemical/biochemical reactions because of the relatively hydrophobic environment in the case that non-hydrophilic melting materials are employed.

The thermal history indicator is designed such that it can be manufactured at a temperature above the melting point of the trigger, if desired. This simplifies the manufacturing process and reduces costs.

Figure 1:
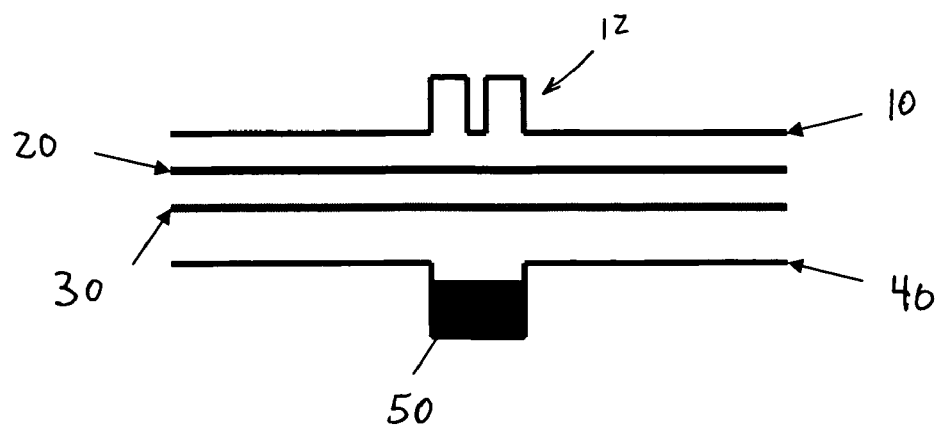
FIG. 1 shows an embodiment of the invention prior to the device being activated.
Figure 2:
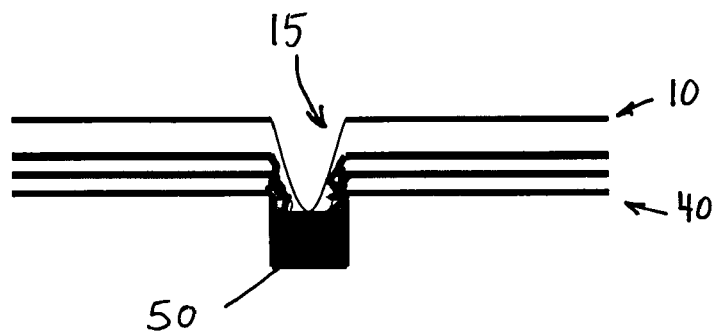
FIG. 2 shows the embodiment of FIG. 1 after it has been activated.

To achieve this effect, compartmentalisation of the device is necessary. This is possible by pipetting (or similarly filling, as appropriate) the temperature sensitive material into specific wells or compartments, and then sealing them in place with a breakable film (or barrier). For example, as shown in FIG. 1, a well of the device is filled with a colored material 50 having a defined melting point. A breakable film 30 then seals the colored material 50 in the well.

In one embodiment, the wells are filled within two separate containers that are hinged together. These wells are potentially interlocking in a favourable position with respect to one another. At a central, accessible position between the wells is a sensing device which becomes freely accessible to the molten material when activated. For instance, as shown in FIG. 1, a sensing device such as white filter paper 20 is located above the well of colored material 50. When the device is activated by pressing on a protruding button 12, the button ruptures the film 30 and pushes a portion of the white filter paper 20 into the well of colored material 50. This sensing device 20 can then interact with the molten material directly or by chemicals, biochemicals or microorganisms carried by the molten material. Thus the apparatus indicates a time-temperature effect.

Figure 3:
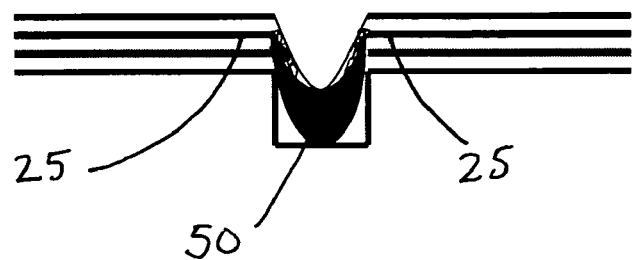
FIG. 3 shows the embodiment of FIGS. 1 and 2 after the predetermined temperature has been exceeded.

As shown in FIG. 3, the melted phase of the colored material 50 may be drawn into the edges 25 of the sensing device 20 by means of a wick. The wick may be an absorbent or adsorbent phase or act by capillary attraction (as achieved, for example the use of thin bore capillaries).

To provide the necessary activation, the melting material must be cooled below the temperature at which it melts so that it solidifies in distinct positions within the compartmentalised device. The device is then assembled in a form whereupon seals restricting fluid flow (of the melting material) are irreversibly broken. The device then becomes a one-way trigger.

The process of activation is physical in preference, although it may be achieved by other means.

One elegant approach is to rupture a compartmentalisation barrier upon assembly of the indicator. Alternatively, the barrier may be ruptured upon attachment to the specific product. This barrier will be specifically engineered to optimise activation.

The compartmentalisation design means that the indicator can be shipped at, for example, room temperature without activation. In addition, the indicators may be attached to the products without being activated, if required. This is a very useful feature as it reduces the cost associated with the shipping of the products.

A delay in melting is desirable to facilitate convenient transportation of the activated device. This is achieved by the incorporation of a vital component of the device, a heat insulating material (or materials). The insulating material acts as a temperature buffer between the product to which the indicator is applied, and the ambient temperature. This material may be constructed in a variety of different forms and be engineered to give the most appropriate time-temperature delay profile required for the product.

The compartmentalisation design means that the product can be shipped at, for example, room temperature without activation. This is a very important feature as it reduces the cost associated with the shipping of the products.

The melting of the (insulated) material must effect an irreversible event. This may be:
  i. A chemical reaction which may be viewed through a viewing port provided on the indicator. For example, this may be a region where the molten phase itself, or a component within it, comes into contact with another species located away from the solid material, but accessible to the material once it has melted.
  ii. A chemical reaction which causes a scent to be smelt through an inhalation port. This inhalation port may provide access to a region where the molten phase itself, or a component within it, comes into contact with another species located away from the solid material, but accessible to the material once it has melted.
  iii. An enzymatic reaction which may be viewed through a viewing port.

Irreversibility relates to both activation of the device and to an indication that a reaction has been detected by the sensor. Once triggered or activated, e.g. by rupturing a barrier, and the required temperature has been reached, the response of the sensor is irreversible. However, the insulating material will "build-in" a sensing delay such that if the device is re-cooled to below the trigger temperature the reaction with the sensor can be stopped and the irreversible event prevented. At this point the device will, however, still be irreversibly activated or triggered.

On the basis of the event (interaction of melting device with sensor) product can be rejected (eg food or pharmaceutical) or the environmental temperature can be defined as inappropriate.

Various stages of the indicator lifetime can be summarised as follows:
  i. Compartmentalised melting phase (containing/not containing reactant) having a breakable membrane.
  ii. Cooling the product to below the melting temperature of the melting phase, and rupturing the breakable membrane
  iii. Melting delay achieved (post activation) by insulator: Interaction with sensing device delayed.
  iv. Detectable (irreversible) response, which might be visual, olfactory or audible Some more specific examples are described below.

Example 1

A material with a melting point of around 10° C. is pipetted into two compartments within a plastic device shaped like an 'opened clam shell'. The material is sealed into the device by a breakable membrane.

The indicator is constructed such that it contains an outermost insulating material which can delay the melting of the material. The device is then cooled to below 10° C. and the sensing device is placed inside the device so that when the 'clam' is closed on the device, the sensor ruptures the seal and the device becomes active.

Example 2

As Example 1, although the melting material carries a reactive species such as a chemical, enzyme or microorganism.

Various other embodiments are envisaged. For example, it is possible to have a material that interacts with a sensing device in its solid state. When the temperature sensitive material is in its molten phase, the material can flow away from the sensing device, ceasing the interaction and altering the chemical, biochemical, or microbiological properties of the sensing device.

Various modifications can be made within the scope of the appended claims.

APPENDIX TO THE DESCRIPTION (Text of Priority Document)

Background

There is great deal of interest at the present time in defining inappropriate temperatures to which products like foods and pharmaceuticals have been exposed. This information can then be used to reject the products and hence protect consumer health. Similarly, it is important that a time delay or shelf-life is built into a quality monitoring system. The following text defines the development of a novel time-temperature indicator which can trigger one or more detection systems.

Until recently, time-temperature indicators have been based around the production of easily visible responses to time-temperature linked events. However, limitations are imposed upon these systems in the sense that every product must be examined by eye or another optical system to confirm that a chemical event had occurred. The following invention is applicable to optical systems in a broad sense in terms of the activation and compartmentalisation technologies employed.

SHORT DESCRIPTION OF THE INVENTION

According to the present invention there is provided an insulated melting device which upon triggering allows a temperature melted molten phase to interact directly with a sensing device and alter its physio-chemical properties (chemical, biochemical or microbiological).

According to the present invention there is provided an insulated melting device which upon triggering allows a temperature melted molten phase carrying a reacting species to interact directly or indirectly with a sensing device and alter its physio-chemical properties (chemical, biochemical or microbiological).

According to the present invention there is provided an insulated melting device which upon triggering allows a temperature melted molten phase to cease interaction with a sensing device and later its physio-chemical properties (chemical, biochemical or microbiological).

According to the present invention there is provided an insulated melting device which upon triggering allows a temperature melted molten phase carrying a reacting species to cease interacting directly or indirectly with a sensing device and alter its physio-chemical properties (chemical, biochemical or microbiological).

Product Outline

Basic Trigger

A temperature indicator relies on a temperature specific trigger. The principle component of the trigger of this product is a chemical that melts at a specific temperature. A broad range of chemical species are appropriate for this purpose and mixtures thereof to give a sharp or broad melting profile.

Enhanced Trigger

The melting trigger can usefully be employed in many circumstances when it acts as a carrier to another chemical, biochemical (enzyme) or microbiological species which participates in a reaction as a consequence of it being freed from the trigger matrix upon melting. This species may react with another species located away from the solid matrix but in contact upon melting. Similarly, the additional reacting species (second reactant) may also be located within the trigger matrix. This system also slows the rate of chemical/biochemical reactions because of the relatively hydrophobic environment if non-hydrophilic melting materials are employed.

Compartmentalisation

The product is designed such that it can be manufactured at a temperature above the melting point of the trigger if desired. To achieve this effect, compartmentalisation is necessary. This is possible by pipetting (or similarly filing the appropriate) the trigger material into specific wells (or compartments) and then sealing them in place with a breakable film (or barrier). One option is to fill wells within two separate containers which may be hinged together. These wells are potentially interlocking in a favourable position with respect to one another. At a central/accessible position between the wells (which when activated (below) by temperature) a sensing device becomes freely accessible to the melting material. This sensing device can be influenced by the melting material directly or by the chemicals, biochemicals or microorganisms it contains and indicate a time-temperature effect.

Transportation

The compartmentalisation design means that the product can be shipped at for example room temperature without activation. This is a very important feature as it reduces the cost associated with the shipping of the products.

Pre-Use Activation

To provide the necessary activation, the melting material must be cooled below the temperature at which it melts so that it solidifies in distinct positions within the compartmentalised device. The device is then assembled in a form whereupon seals restricting fluid flow (of the melting material) are irreversibly broken. The device then becomes a one-way trigger.

Insulator

A delay in melting is desirable to facilitate convenient transportation of the activated device. This may be achieved by the use of a vital component of the device, an insulating material (or materials). This material may be constructed of a variety of different forms and be engineered to give the most appropriate time-temperature delay profile required for the product.

Wicking Mechanism

The melted phase may be drawn to the detecting device by means of a wick. The wick may be an absorbent or adsorbent phase or act by capillary attraction (as achieved, for example the use of thin bore capillaries).

Activation

The process of activation is physical in preference although it may be achieved by other means. One elegant approach is to rupture a compartmentalisation barrier upon attachment to the specific product. This barrier will be specifically engineered to optimise activation.

Sensing Device

The melting of the (insulated) material must effect an irreversible event.

This may be:

A chemical reaction which may be viewed through a viewing port (where the melting phase directly or a component within it comes into contact with another phase located away from the solid material but, accessible to the material once it has melted).

A chemical reaction which may be sniffed through an inhalation port (where the melting phase directly or a component within it comes into contact with another phase located away from the solid material but, accessible to the material once it has melted).

An enzymatic reaction which may be viewed through a viewing port (where the melting phase directly or a component within it comes into contact with another phase located away from the solid material but, accessible to the material once it has melted).

Irreversibility

Irreversibility relates to both activation of the device and relates to triggering of the sensing device. Once triggered and the sensing device is activated the response is irreversible. However, the insulating material will build in a sensing delay such that if the device is re-cooled to below the trigger temperature the reaction with the sensor can be stopped and the irreversible event prevented. At this point the device will, however, still be irreversibly activated.

Outcome

On the basis of the vent (interaction of melting device with sensor) product can be rejected (eg food or pharmaceutical) or the environmental temperature can be defined as inappropriate.

BROAD EXAMPLE OF THE EMBODIMENT

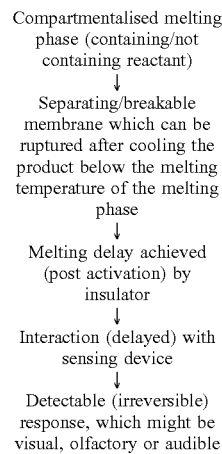

Compartmentalised melting phase (containing/not containing reactant)
↓
Separating/breakable membrane which can be ruptured after cooling the product below the melting temperature of the melting phase
↓
Melting delay achieved (post activation) by insulator
↓
Interaction (delayed) with sensing device
↓
Detectable (irreversible) response, which might be visual, olfactory or audible

SPECIFIC EXAMPLES

Example 1

A material with a melting point around 10° C. is pipetted into two compartments within a plastic device shaped like an 'opened clam shell'. The material is sealed into the device which is constructed such that it contains an outermost insulating material which can delay the melting of the material. The device is then cooled to below 10° C. and the sensing device is placed inside the device so that when the 'clam' is closed on the device, the sensor ruptures the seal and the device becomes active.

Example 2

As Example 1, although the melting material contains another material like a chemical, enzyme or microorganism.

The invention claimed is:

1. A thermal history indicator, comprising
a temperature sensitive material;
a sensing device, wherein an irreversible alteration of the physio-chemical properties of the sensing device occurs when the temperature exceeds a pre-determined value, characterised in that the thermal history indicator comprises a heat insulating material which buffers the temperature sensitive material and stops the sensing device undergoing the physio-chemical alteration if the temperature transiently exceeds, and is then re-cooled to below, the pre-determined value; and
activation means for activating the thermal history indicator, wherein triggering the activation means allows a change in how a molten phase of the temperature sensitive material interacts with the sensing device, thereby altering a chemical, biochemical or microbiological property of the sensing device.

2. A thermal history indicator as claimed in claim 1, wherein the molten phase of the temperature sensitive material interacts directly with the sensing device to alter its chemical, biochemical or microbiological properties.

3. A thermal history indicator as claimed in claim 1, wherein the molten phase of the temperature sensitive material carries a reactive species to interact with the sensing device to alter its chemical, biochemical or microbiological properties.

4. A thermal history indicator as claimed in claim 3 wherein the interaction of the reactive species and the sensing device is direct.

5. A thermal history indicator as claimed in claim 3 wherein the interaction of the reactive species and the sensing device is indirect.

6. A thermal history indicator as claimed in claim 1 wherein triggering of the activation means allows a molten phase of the temperature sensitive material to cease to interact with the sensing device, thereby altering the chemical, biochemical or microbiological properties of the sensing device.

7. A thermal history indicator as claimed in claim 6 wherein prior to triggering, the temperature sensitive material and the sensing device interact directly.

8. A thermal history indicator as claimed in claim 7, wherein the temperature sensitive material carries a reactive species, which prior to triggering, interacts with the sensing device.

9. A thermal history indicator as claimed in claim 8 wherein the interaction of the reactive species and the sensing device is direct.

10. A thermal history indicator as claimed in claim 8 wherein the interaction of the reactive species and the sensing device is indirect.

11. A thermal history indicator as claimed in claim 1, further comprising at least one compartment.

12. A thermal history indicator as claimed in claim 11 wherein the at least one compartment comprises a well.

13. A thermal history indicator as claimed in claim 11 wherein the at least one compartment is sealed by a film or barrier which can be broken.

14. A thermal history indicator as claimed in claim 11, wherein the at least one compartment comprises a plurality of compartments, and wherein the sensing device is positioned centrally between adjacent ones of the compartments.

15. A thermal history indicator, comprising
a temperature sensitive material;
a plurality of compartments;
a sensing device positioned centrally between adjacent ones of the compartments, wherein an alteration of the physio-chemical properties of the sensing device occurs when the temperature exceeds a pre-determined value, characterised in that the thermal history indicator comprises a heat insulating material which buffers the temperature sensitive material and stops the sensing device undergoing the physio-chemical alteration if the temperature transiently exceeds, and is then re-cooled to below, the pre-determined value;
activation means for activating the thermal history indicator, wherein triggering the activation means allows a change in how a molten phase of the temperature sensitive material interacts with the sensing device, thereby altering a chemical, biochemical or microbiological property of the sensing device.

16. A thermal history indicator, comprising:
a temperature sensitive material;
a sensing device, wherein an alteration of the physio-chemical properties of the sensing device occurs when the temperature of the temperature sensitive material exceeds a pre-determined value for a pre-determined period of time;
a heat insulating material configured to buffer the temperature sensitive material to thereby stop the sensing device from undergoing the physio-chemical alteration if the temperature transiently exceeds, and is then re-cooled to below, the pre-determined value; and
activation means for activating the thermal history indicator, wherein triggering the activation means allows a change in how a molten phase of the temperature sensitive material interacts with the sensing device, thereby altering a chemical, biochemical or microbiological property of the sensing device.

17. The thermal history indicator as claimed in claim 16, further comprising at least one compartment, wherein the temperature sensitive material is located in the at least one compartment.

18. The thermal history indicator as claimed in claim 17, wherein the at least one compartment is sealed with a barrier before the thermal history indicator is activated, and wherein the activation means operates, during activation, to break the barrier such that the sensing device is exposed to the temperature sensitive material.

19. The thermal history indicator as claimed in claim 16, further comprising a plurality of compartment, wherein the sensing device is positioned between adjacent ones of the plurality of compartments.

* * * * *